United States Patent
Shi

(10) Patent No.: US 12,171,022 B2
(45) Date of Patent: Dec. 17, 2024

(54) LBT FAILURE METHOD FOR INFORMATION REPORTING AND RELATED DEVICES

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 337 days.

(21) Appl. No.: 17/563,372

(22) Filed: Dec. 28, 2021

(65) Prior Publication Data

US 2022/0124800 A1  Apr. 21, 2022

Related U.S. Application Data

(63) Continuation of application No. PCT/CN2019/096618, filed on Jul. 18, 2019.

(51) Int. Cl.
*H04W 4/00* (2018.01)
*H04W 74/0808* (2024.01)
*H04W 74/0833* (2024.01)

(52) U.S. Cl.
CPC ... *H04W 74/0808* (2013.01); *H04W 74/0833* (2013.01)

(58) Field of Classification Search
CPC ......... H04W 74/0808; H04W 74/0833; H04W 74/27
See application file for complete search history.

(56) References Cited

U.S. PATENT DOCUMENTS

| | | | |
|---|---|---|---|
| 2014/0036818 A1 | 2/2014 | Koskela et al. | |
| 2018/0176961 A1 | 6/2018 | Babaei et al. | |
| 2019/0132882 A1 | 5/2019 | Li et al. | |
| 2020/0221495 A1* | 7/2020 | Chen | H04W 36/0058 |
| 2021/0007146 A1* | 1/2021 | Agiwal | H04W 74/0833 |
| 2022/0078873 A1* | 3/2022 | Belleschi | H04W 28/24 |
| 2022/0104256 A1* | 3/2022 | Jang | H04W 74/0808 |

(Continued)

FOREIGN PATENT DOCUMENTS

| | | |
|---|---|---|
| CN | 107371168 | 11/2017 |
| CN | 107371273 | 11/2017 |
| CN | 109151869 | 1/2019 |

(Continued)

OTHER PUBLICATIONS

"3rd Generation Partnership Project; Technical Specification Group Radio Access Network; Study on NR-based access to unlicensed spectrum (Release 16)," 3GPP TR 38.889, Dec. 2018, v16.0.0.

(Continued)

*Primary Examiner* — Abdelnabi O Musa
(74) *Attorney, Agent, or Firm* — Hodgson Russ LLP

(57) ABSTRACT

A method for information reporting and related devices are provided. The method includes the following. A terminal detects occurrence of a listen before talk (LBT) failure in an active uplink (UL) bandwidth part (BWP). The terminal reports indication information to a network device when the terminal detects that the LBT failure occurs in any active UL BWP.

20 Claims, 5 Drawing Sheets

NETWORK DEVICE

TERMINAL

(56) References Cited

U.S. PATENT DOCUMENTS

2022/0201758 A1* 6/2022 Wang ............... H04W 36/06
2023/0164849 A1* 5/2023 Agiwal ............. H04W 76/15
                                                        370/329

FOREIGN PATENT DOCUMENTS

CN    109565717    4/2019
CN    109565834    4/2019

OTHER PUBLICATIONS

Intel Corporation, "Detecting and Handling of UL LBT failures," 3GPP TSG-RAN WG2 106, R2-1907382, May 2019.
Ericsson, "Handling UL LBT failures," 3GPP TSG-RAN WG2 #106, Tdoc R2-1907584 (revision of R2-1904747), May 2019.
Ericsson, "LBT model for LAA RRM testing," 3GPP TSG-RAN WG4 Meeting #79, R4-163467, May 2016.
Ericsson et al., "Mapping between QCls and LBT priority classes," 3GPP TSG-RAN WG2 #92, Tdoc R2-156693, Nov. 2015.
WIPO, International Search Report for PCT/CN2019/096618, Apr. 20, 2020.
Huawei et al., "Discussion on Handling of Consistent UL LBT Failure," 3GPP TSG-RAN WG2 Meeting 106, R2-1907737, Apr. 2019.
EPO, Extended European Search Report for EP Application No. 19937536.1, May 17, 2022.
Samsung, "UL LBT problem detection," 3GPP TSG-RAN WG2 Meeting #106, R2-1907636 (Update of R2-1803261), May 2019.
Nokia et al., "UL LBT failure handling," 3GPP TSG-RAN WG2 Meeting #106, R2-1906758 (revision of R2-1903714), May 2019.
CNIPA, First Office Action for CN Application No. 201980083944.0, Nov. 2, 2022.

* cited by examiner

LBT FAILURE METHOD FOR INFORMATION REPORTING AND RELATED DEVICES

CROSS REFERENCE TO RELATED APPLICATION(S)

This application is a continuation of International Application No. PCT/CN2019/096618, filed on Jul. 18, 2019, the entire disclosure of which is incorporated herein by reference.

TECHNICAL FIELD

This disclosure relates to the field of communication technology, and more particularly to a method for information reporting and related devices.

RELATED ART

At present, in some communication systems, such as a new radio unlicensed (NR-U) system, data transmission is performed based on a listen before talk (LBT) mechanism. The LBT mechanism means that a transmitting end first needs to monitor whether a channel is idle. If the channel is idle, the transmitting end can preempt the channel to transmit data to a receiving end. If the channel is occupied, the transmitting end needs to back off for a period of time and then listens again, and can transmit data only when an idle channel is monitored. For example, after an idle channel is detected through uplink (UL) LBT, the terminal can perform UL transmission on the idle channel. At present, UL transmission failure often occurs. For example, UL transmission failure may occur if no idle channel is detected; or UL transmission failure may occur if no response message for UL transmission is received from a network side. After multiple UL transmission failures, the terminal will trigger a random access channel (RACH) procedure or a radio link failure (RLF) procedure. However, the network side has no idea whether these procedures result from UL transmission failure caused by LBT failure, and an LBT failure problem cannot be detected by the network side, which may lead to unreliability in data transmission.

SUMMARY

In a first aspect, a method for information reporting is provided in implementations of the disclosure. The method is applicable to a terminal. The terminal is configured with one or more uplink (UL) bandwidth parts (BWP). At least one active UL BWP exists in the one or more UL BWPs. The method includes the following. The terminal detects occurrence of an LBT failure in the active UL BWP. The terminal reports indication information to a network device when the terminal detects that the LBT failure occurs in any active UL BWP, where the indication information is used for indicating the LBT failure.

In a second aspect, a method for information reporting is provided in implementations of the disclosure. The method includes the following. A network device receives indication information reported by a terminal, where the indication information is used for indicating an LBT failure. The network device configures a UL BWP corresponding to the LBT failure according to the indication information.

BRIEF DESCRIPTION OF THE DRAWINGS

The following will give an introduction to the accompanying drawings used for describing implementations or the related art.

DETAILED DESCRIPTION

The following will describe technical solutions of implementations of the disclosure with reference to the accompanying drawings.

It can be understood that, the technical solutions of implementations of the disclosure are applicable to a communication system in which data transmission is performed based on a listen before talk (LBT) mechanism, such as a new radio unlicensed (NR-U) system, a long term evolution (LTE) system, a $5^{th}$ generation (5G) system, etc.

Figure 1:
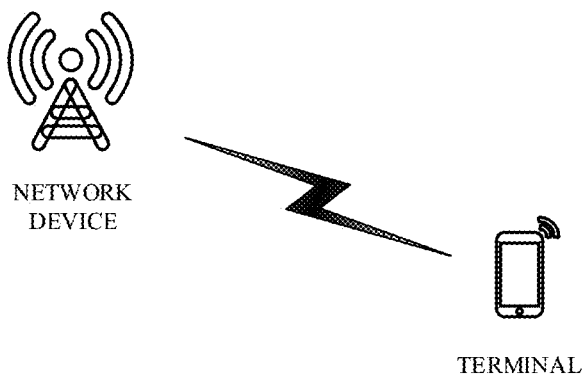
FIG. 1 is an architectural diagram of a communication system provided in implementations of the disclosure.

FIG. 1 is an architectural diagram of a communication system provided in implementations of the disclosure. As illustrated in FIG. 1, for example, a transmitting end is a terminal and a receiving end is a network device, the communication system includes one or more network devices 101 and one or more terminals 102. FIG. 1 merely illustrates one network device 101 and one terminal 102. Data transmission can be performed between the network device 101 and the terminal 102.

For example, the communication system is an NR-U system. An NR system is operable in an unlicensed spectrum which includes the following scenarios: a carrier aggregation (CA) scenario, a dual connectivity (DC) scenario, a standalone (SA) scenario, an NR single-cell scenario, and the like. In the DC scenario, a cell configured for the terminal includes a master cell group (MCG) and a secondary cell group (SCG). The MCG includes a primary cell (PCell) and a secondary cell (SCell). The SCG includes a primary secondary cell (PScell) and an SCell. In a non-DC scenario, a cell configured for the terminal may be an MCG which may include a PCell and an SCell, or may be an independent cell.

In the CA scenario, the PCell is operable in a licensed spectrum, and the SCell is operable in an unlicensed spectrum through CA. In the DC scenario, the PCell is operable in an LTE licensed spectrum, and the PScell is operable in an NR unlicensed spectrum. In the SA scenario, NR system is operable in an unlicensed spectrum as an independent cell.

In the NR single-cell scenario, up link (UL) is operable in a licensed spectrum, and down link (DL) is operable in an unlicensed spectrum. If an operating frequency band of NR-U system is an unlicensed spectrum such as a 5 GHz (gigahertz) unlicensed spectrum or a 6 GHz unlicensed spectrum, it is necessary to ensure fairness with other systems working in the unlicensed spectrum such as a wireless fidelity (WiFi) system. For example, an influence of the NR-U on systems that have been deployed in the unlicensed spectrum (such as the WiFi system) cannot exceed an influence between these systems (such as the WiFi system). Therefore, the system can adopt a listen before talk (LBT) mechanism for data transmission.

Specifically, a transmitting end, such as the terminal, can perform UL transmission in an unlicensed spectrum. Before UL transmission, it is necessary to adopt the LBT mechanism to monitor whether a channel is available. If the channel is unavailable, that is, LBT fails, the terminal has to wait for a next transmission opportunity to perform LBT again. In NR-U, LBT failure will result in UL transmission failure, because consistent LBT failures will lead to radio link failure (RLF) of the terminal or UL data transmission failure, which adversely affects reliability in data transmission. However, the LBT failure cannot be detected by a network side, and as a result, the network side is unable to adjust configuration with respect to such LBT failure problem to ensure reliability in data transmission.

Therefore, in the disclosure, the terminal can detect an LBT failure that occurs in an active UL bandwidth part (BWP) and report to the network device indication information that is used for indicating the LBT failure, such that the network side can promptly find such LBT failure problem, which is beneficial to improving reliability in data transmission.

In the disclosure, the UL transmission may include transmission of a scheduling request (SR), a physical random access channel (PRACH), a physical uplink shared channel (PUSCH) message, etc. The SR may be used for requesting a UL resource. The PRACH may be triggered by a random access channel (RACH). PUSCH transmission mainly includes configured grant-based UL data transmission.

In the disclosure, the network device may be an entity for transmitting or receiving information at the network side, which may be, for example, a base station. The base station may be used for communicating with one or more terminals, or may be used for communicating with one or more base stations which have some functions of the terminal (for example, communication between a macro base station and a micro base station such as access point (AP)). The base station may be a base transceiver station (BTS) in a time division synchronous code division multiple access (TD-SCDMA) system, or may be an evolutional NodeB (eNB) in an LTE system, or may be a gNB in a 5G system or an NR system, or the like, which will not be enumerated herein. Alternatively, the network device 101 may also be a transmission point (TP), an AP, a transmission and receiver point (TRP), a relay device, a central unit (CU), or other network devices which have functions of the base station, and the disclosure is not limited in this regard.

In the disclosure, the terminal is a device that has communication functions and may be, for example, an in-vehicle device, a wearable device, a handheld device (such as smart phone), etc. The terminal may also be called in other names, such as user equipment (UE), subscriber unit, mobile station, mobile unit, terminal device, or the like, and the disclosure is not limited in this regard.

It can be understood that, the communication system illustrated in FIG. 1 is merely an example and does not constitute limitation on the disclosure. Those of ordinary skill in the art can appreciate that, with evolution of network architectures and emergence of new service scenarios, for similar technical problems, the technical solutions provided in the disclosure can also be applied.

The disclosure discloses a method for information reporting and related devices. As such, the terminal can detect an LBT failure and report the LBT failure to the network device, such that the network side can promptly find an LBT failure problem, which is possible to improve reliability in data transmission. The following will elaborate with reference to the accompanying drawings.

Figure 2:
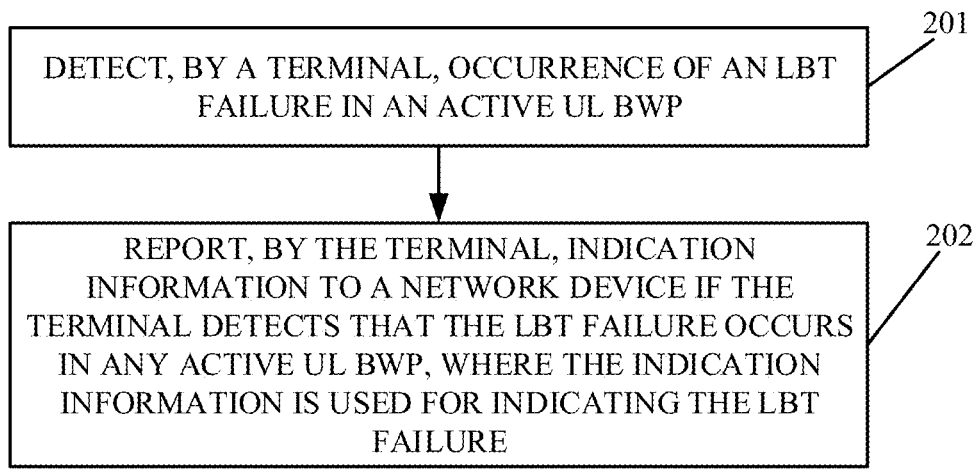
FIG. 2 is a schematic flowchart of a method for information reporting provided in implementations of the disclosure.

FIG. 2 is a schematic flowchart of a method for information reporting provided in implementations of the disclosure. The method in this implementation is applicable to the communication system described above, and more particularly to a transmitting end such as the terminal described above. The terminal is configured with one or more UL BWPs, and at least one active UL BWP exists in the one or more UL BWPs. As illustrated in FIG. 2, the method includes the following.

201, the terminal detects occurrence of an LBT failure in the active UL BWP.

The LBT failure can indicate that UL transmission has an LBT failure problem (which may be referred to as "LBT problem" for short). The LBT failure can be detected in a preset detecting manner. For example, the terminal can count the number of LBT failure indications obtained during UL transmission on the active UL BWP, and if the number of LBT failure indications corresponding to any active UL BWP is greater than a preset threshold, the terminal can determine that the LBT failure occurs in the active UL BWP.

In some implementations, the number of LBT failure indications may be the number of LBT failure indications received within a preset time period, for example, within a duration of a first timer, and/or the number of LBT failure indications may be the number of LBT failure indications that are consecutively obtained. For example, if the number of LBT failure indications obtained during UL transmission on any active UL BWP within the preset time period is greater than the preset threshold, the terminal can determine that the LBT failure occurs in the active UL BWP. Specifically, if the terminal receives an LBT failure indication during UL transmission on the active UL BWP, the terminal can increment a counter by one and start or restart the first timer. In other words, the terminal increments the counter each time the terminal receives the LBT failure indication on the active UL BWP, to count the number of LBT failure indications within the duration of the first timer. If the first timer expires, the terminal can clear the counter. For another example, if the number of LBT failure indications that are consecutively obtained during UL transmission on any active UL BWP is greater than the preset threshold, the terminal can determine that the LBT failure occurs in the active UL BWP. For another example, if the number of LBT failure indications that are consecutively obtained during UL transmission on any active UL BWP within the preset time period is greater than the preset threshold, the terminal can determine that the LBT failure occurs in the active UL BWP.

The preset time period and/or the preset threshold may be pre-set, or may be indicated by a network device, for example, information of the preset time period and/or the preset threshold may be carried in configuration information for the terminal by the network device, or the like, and the disclosure is not limited in this regard.

In some implementations, preset time periods and/or preset thresholds corresponding to different BWPs may be the same or different. For example, the preset time periods corresponding to different BWPs may be pre-set, and/or the preset thresholds corresponding to different BWPs may be pre-set. For example, a larger BWP corresponds to a higher preset threshold. As such, the terminal can count the number of LBT failure indications based on a preset time period corresponding to the active UL BWP, and/or compare the number of LBT failure indications corresponding to the active UL BWP with the preset threshold corresponding to this BWP, to determine occurrence of the LBT failure, which is conducive to flexibility and reliability in determination of the LBT failure.

It can be understood that, the LBT failure indications obtained consecutively may mean that the terminal receives the LBT failure indication within a duration of each timer that is started after reception of the LBT failure indication, and/or may mean that no channel available indication is received by the terminal while obtaining the LBT failure indication.

For example, when counting the number of LBT failure indications obtained during UL transmission on the active UL BWP, the terminal can count with a counter upon receiving the LBT failure indication during UL transmission on the active UL BWP, for example, increment the counter by 1, and start the first timer. If the terminal receives the LBT failure indication during UL transmission on the active UL BWP within the duration of the first timer, the terminal counts with the counter, for example, increments the counter by 1 again. If no LBT failure indication is received by the terminal during UL transmission on the active UL BWP when the first timer expires, the terminal can clear the counter. In addition, if the terminal receives the LBT failure indication within the duration of the first timer, the terminal can restart the first timer, to control counting of the counter according to whether the LBT failure indication is received within the duration of the first timer, thereby counting to obtain the number of LBT failure indications obtained during UL transmission on the active UL BWP. If the counted number reaches the preset threshold, the terminal can determine that the LBT failure occurs.

For another example, if the LBT failure indication is received during UL transmission on the active UL BWP, the terminal can count with a counter, for example, increment the counter by 1. If the channel available indication is received in the active UL BWP before receiving the next LBT failure indication in the active UL BWP, the terminal clears the counter. If no channel available indication is received in the active UL BWP before the terminal receives the next LBT failure indication in the active UL BWP, the terminal controls counting of the counter according to the LBT failure indication received, for example, increments the counter by 1 again, thereby counting to obtain the number of LBT failure indications obtained during UL transmission on the active UL BWP. As such, if no channel available indication is received in the active UL BWP while the terminal is obtaining all the LBT failure indications corresponding to the number of LBT failure indications, when the counted number reaches the preset threshold, the terminal can determine that the LBT failure occurs.

For another example, if the terminal receives the LBT failure indication during UL transmission on the active UL BWP, the terminal can count with a counter, for example, increment the counter by 1, and start a first timer. If the LBT failure indication is received during UL transmission on the active UL BWP and no channel available indication is received within the duration of the first timer, the terminal counts with the counter, for example, increments the counter by 1 again. If the channel available indication is received within the duration of the first timer, or no LBT failure indication is received in the active UL BWP when the first timer expires, the terminal can clear the counter. In addition, if the LBT failure indication is received and no channel available indication is received within the duration of the first timer, the terminal can restart the first timer, to control counting of the counter according to whether the LBT failure indication and the channel available indication is received within the duration of the first timer. When the counted number reaches the preset threshold, the terminal can determine that the LBT failure occurs.

The duration of the first timer may be pre-set, for example, configured by a radio resource control (RRC) layer, or the duration of the first timer may be indicated by the network device, for example, the duration of the first timer may be carried in configuration information for the terminal by the network device, and the disclosure is not limited in this regard. Optionally, different BWPs may correspond to the same or different first timers, which may be pre-set.

Optionally, the counted number of LBT failure indications may be intended for a specified type of UL transmission (such as SR, PRACH, or PUSCH), or may be intended for all types of UL transmission (such as SR, PRACH, and PUSCH), and the disclosure is not limited in this regard. For example, in implementations of the disclosure, the number of LBT failure indications corresponding to all types of UL transmission may be counted, to promptly find an LBT problem.

202, if the terminal detects that the LBT failure occurs in any active UL BWP, the terminal reports indication information to the network device, where the indication information is used for indicating the LBT failure.

In some implementations, if the terminal detects that the LBT failure occurs in any active UL BWP, the terminal starts a second timer. If no channel available indication is received in a UL BWP where the LBT failure occurs (marked as a first UL BWP) by the terminal within a duration of the second timer, the terminal reports the indication information to the network device. In other words, before reporting the indication information to the network device, the terminal can start the second timer to determine an available status of a channel corresponding to the first UL BWP, and report the LBT failure to a network side only if no channel available indication for the first UL BWP is received within the duration of the second timer, where the channel available indication is used for indicating that a channel is available. As such, it is possible to make reporting of the LBT failure more reliable. It can be understood that, the terminal may also receive the LBT failure indication within the duration of the second timer.

Alternatively, in other implementations, the terminal can start a second timer when the counted number of LBT failure indications corresponding to any active UL BWP is greater than the preset threshold. If no channel available indication is received in the active UL BWP within the duration of the second timer, the terminal determines that the LBT failure occurs in the active UL BWP. Then the terminal can report the indication information to the network device.

The duration of the second timer may be pre-set, for example, configured by an RRC layer, or the duration of the second timer may be indicated by the network device, and the disclosure is not limited in this regard.

Optionally, the indication information may be a media access control (MAC) control element (CE) message or physical layer signaling.

Optionally, the manner in which the terminal reports the indication information to the network device may be various. For example, the terminal may report the indication information to the network device through a RACH procedure, or may report the indication information to the network device through an RLF procedure.

For example, in some implementations, a cell configured for the terminal includes a PCell and an SCell. Suppose that a BWP where the LBT failure occurs is the first UL BWP. If the first UL BWP is not an initial UL BWP and the first UL BWP is a UL BWP configured for the PCell, the terminal can switch to the initial UL BWP from the first UL BWP. Then the terminal can initiate the RACH procedure on the initial UL BWP, and transmit the indication information to the network device through the RACH procedure.

In the disclosure, the initial UL BWP may be obtained by reading system information block type 1 (SIB1) by the terminal when the terminal initially accesses a cell, or the initial UL BWP may be configured through an RRC reconfiguration message, or the initial UL BWP may be obtained during a connection state transition of the terminal, or the like, and the disclosure is not limited thereto.

For another example, in some implementations, a cell configured for the terminal includes a PCell and an SCell, and each cell has one active UL BWP. If the first UL BWP where the LBT failure occurs is a UL BWP configured for the SCell and an active UL BWP of the PCell is not the initial UL BWP, the terminal switches to the initial UL BWP from the active UL BWP of the PCell. Then the terminal can initiate the RACH procedure on the initial UL BWP, and transmit the indication information to the network device through the RACH procedure. Since the SCell has no initial UL BWP, that is, if a UL BWP of the SCell has an LBT problem, UL BWP switching in the PCell will be needed (if the active UL BWP is not the initial UL BWP). If a present active UL BWP is the initial UL BWP, no switching will be needed.

For another example, in some implementations, if the first UL BWP where the LBT failure occurs is the initial UL BWP, the terminal can initiate the RLF procedure and transmit the indication information to the network device through the RLF procedure. Optionally, if the LBT failure occurs in a non-initial UL BWP and occurs again in the initial UL BWP after the terminal switches to the initial UL BWP, the terminal may also trigger the RLF procedure to report the indication information used for indicating the LBT failure.

For example, a cell configured for the terminal includes an MCG and an SCG, the MCG includes a PCell and an SCell, the SCG includes a PScell and an SCell, and each cell has one active UL BWP. The terminal can trigger the RLF procedure according to a cell corresponding to the first UL BWP where the LBT failure occurs, such as initiating an RRC reestablishment procedure, a failure information procedure, or the like. Specifically, if the first UL BWP is a UL BWP configured for the PCell of the MCG, the terminal can initiate the RRC reestablishment procedure. If the first UL BWP is a UL BWP configured for the PScell of the SCG, the terminal can initiate an SCG failure information procedure. If the first UL BWP is a UL BWP configured for the SCell of the MCG or the SCell of the SCG, the terminal can initiate the failure information procedure.

For another example, in some implementations, a cell configured for the terminal includes a PCell and an SCell. When reporting the indication information to the network device, the terminal can switch to a second UL BWP from the first UL BWP where the LBT failure occurs, that is, switch to another BWP, and then the terminal can initiate the RACH procedure on the second UL BWP and transmit the indication information to the network device through the RACH procedure. Optionally, the second UL BWP may be a UL BWP configured with a PRACH resource and configured for the PCell, and/or may be a UL BWP configured with a physical uplink control channel (PUCCH) resource and configured for the PCell, and/or may be a UL BWP configured with a semi-static resource (such as configured grant) and configured for the PCell. For example, the second UL BWP is a UL BWP configured with a PRACH resource and configured for the PCell. As such, the terminal can switch to the UL BWP configured with a PRACH resource and configured for the PCell from a UL BWP where the LBT failure occurs, to report the indication information.

Optionally, the RACH procedure described above may include transmission of msg3 to the network device by the terminal, where the msg3 contains the indication information. In other words, the indication information used for indicating the LBT failure can be carried in the msg3.

For another example, in some implementations, a cell configured for the terminal includes an MCG and an SCG, where the MCG includes a PCell and an SCell and the SCG includes a PScell and an SCell. The terminal can initiate the RRC reestablishment procedure if a first UL BWP where the LBT failure occurs is a UL BWP configured for the PCell of the MCG, and transmit the indication information to the network device through the RRC reestablishment procedure. Optionally, the terminal can initiate the failure information procedure if the first UL BWP is a UL BWP configured for the PScell or the SCell, and transmit the indication information to the network device through the failure information procedure.

For another example, in some implementations, the cell configured for the terminal may be multiple cells. The terminal can report the indication information to the network device through a cell other than a first cell among the multiple cells, thereby reporting the LBT failure to the network side. The LBT failure occurs in the first UL BWP and the first cell is a cell where the first UL BWP is configured.

In some implementations, the indication information may further include identifier information (sub-carrier identifier information) of the cell where the first UL BWP is configured (where the LBT failure occurs in the first UL BWP), for example, cell group identity (ID), cell ID, cell index, etc. As such, the network device can determine the first UL BWP according to the identifier information of the cell where the first UL BWP is configured.

In some implementations, the indication information may further include information of the first UL BWP where the LBT failure occurs. As such, the network device can quickly determine the first UL BWP according to the information of the first UL BWP.

In some implementations, the indication information may further include a UL transmission type corresponding to the LBT failure. As such, the network device can configure the first UL BWP according to the UL transmission type.

In some implementations, the indication information may further include an LBT category and/or a priority of a channel accessed by the terminal corresponding to the LBT failure. As such, the network device can configure the first UL BWP according to the LBT category and/or the priority of the channel accessed by the terminal.

In this implementation, the terminal can detect occurrence of the LBT failure in the active UL BWP and report to the network device the indication information indicating the LBT failure. As such, the network side can promptly find an LBT failure problem, which is conducive to improving reliability in data transmission.

Figure 3:
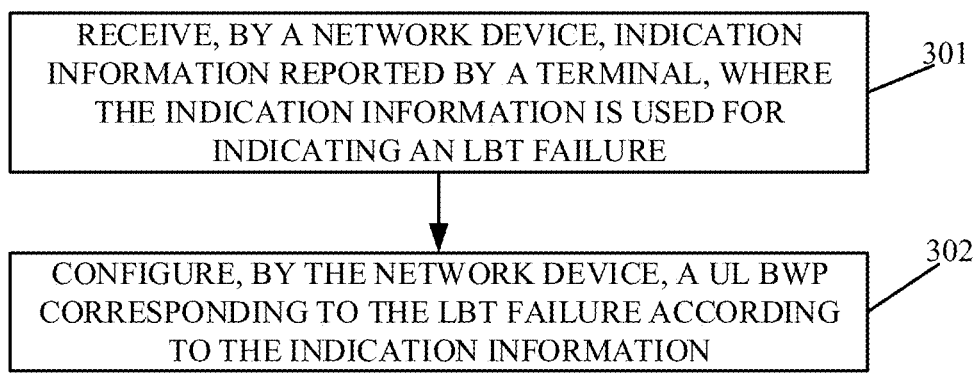
FIG. 3 is a schematic flowchart of a method for information reporting provided in other implementations of the disclosure.

FIG. 3 is a schematic flowchart of a method for information reporting provided in other implementations of the disclosure. The method in this implementation is applicable to the network device described above. As illustrated in FIG. 3, the method includes the following.

301, the network device receives indication information reported by a terminal, where the indication information is used for indicating an LBT failure.

The LBT failure is indicated in the indication information reported to the network device by the terminal after the terminal detects occurrence of the LBT failure in an active UL BWP, to indicate the LBT failure, that is, to indicate that UL transmission has an LBT problem, which helps a network side to promptly find an LBT failure problem.

Optionally, the network device can receive or obtain the indication information from the terminal through a RACH procedure or an RLF procedure initiated by the terminal. The RACH procedure includes that the network device receives msg3 transmitted by the terminal, where the msg3 contains the indication information. That is, the indication information can be carried in the msg3.

Optionally, the indication information is a MAC CE or physical layer signaling.

302, the network device configures a UL BWP corresponding to the LBT failure according to the indication information.

When configuring a UL BWP according to the indication information, the network device can reconfigure the UL BWP corresponding to the LBT failure to be in other frequency bands, thereby improving reliability in data transmission. For example, the network device may reconfigure the BWP where the LBT failure occurs to be in another frequency band through an RRC reconfiguration message, where the frequency band does not include a frequency band where the LBT failure occurs.

In some implementations, the LBT failure occurs in the first UL BWP, and the indication information further includes identifier information of a cell where the first UL BWP is configured. The network device can determine the first UL BWP where the LBT failure occurs according to the identifier information, and configure the first UL BWP. As such, it is possible to improve reliability in data transmission.

In some implementations, the indication information may further include a UL transmission type corresponding to the LBT failure. As such, the network device can configure the first UL BWP based on the UL transmission type. For example, the network device can reconfigure the UL BWP corresponding to the LBT failure to be in other frequency bands, and configure, in the other frequency bands, a UL transmission resource of the UL transmission type indicated by the indication information.

In some implementations, the indication information may further include an LBT category and/or a priority of a channel accessed by the terminal corresponding to the LBT failure. As such, the network device can configure the first UL BWP based on the LBT category and/or the priority of the channel accessed by the terminal. For example, the network device can further determine a UL transmission type corresponding to the LBT failure according to the LBT category and/or the priority of the channel accessed by the terminal. In this way, when reconfiguring, the network device can reconfigure the UL BWP corresponding to the LBT failure to be in other frequency bands, and configure, in the other frequency bands, a UL transmission resource corresponding to the UL transmission type.

In this implementation, by receiving the indication information that is reported by the terminal when the LBT failure is detected, the network device can promptly find the occurred LBT failure, and configure the UL BWP where the LBT failure occurs according to the indication information, which is possible to solve an LBT failure problem, thereby improving reliability in data transmission.

Figure 4:
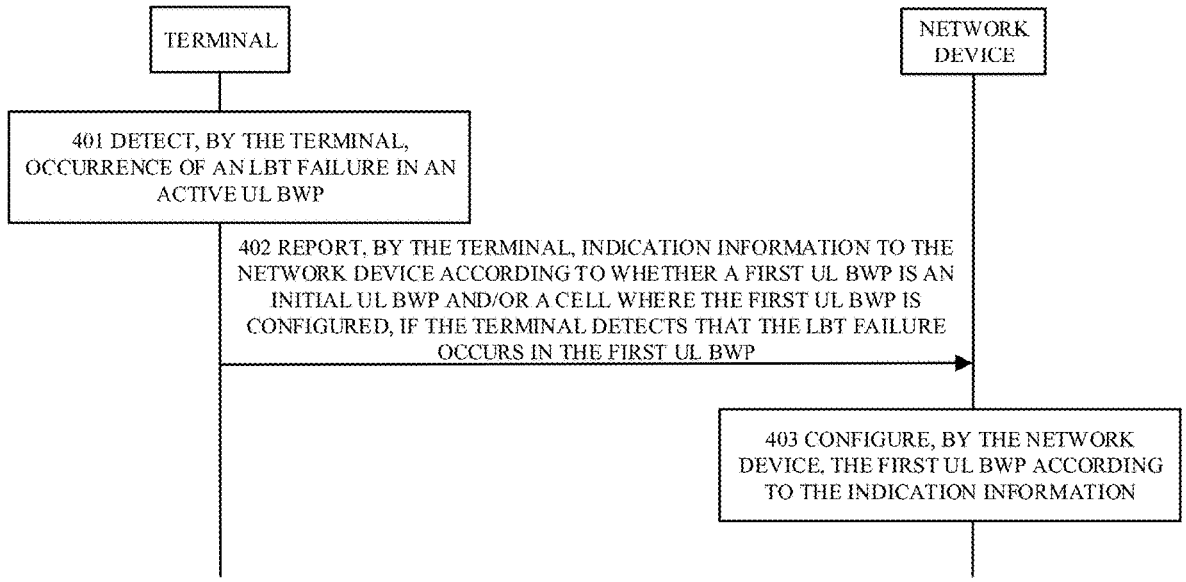
FIG. 4 is a schematic interaction diagram of a method for information reporting provided in implementations of the disclosure.

FIG. 4 is a schematic interaction diagram of a method for information reporting provided in implementations of the disclosure. In this implementation, a terminal is configured with one or more UL BWPs, and at least one active UL BWP exists in the one or more UL BWPs, for example, each cell configured for the terminal may have one active UL BWP. If an LBT failure is detected, the terminal can switch to an initial UL BWP from a UL BWP where the LBT failure occurs and initiate a RACH procedure to report the LBT failure to a network device through msg3, or initiate an RLF procedure on the initial UL BWP to report the LBT failure to the network device. As illustrated in FIG. 4, the method includes the following.

401, the terminal detects occurrence of an LBT failure in the active UL BWP.

Specifically, for the manner in which the terminal detects occurrence of the LBT failure in the active UL BWP, reference can be made to related descriptions in implementations illustrated in FIG. 2. Optionally, indication information may be a MAC CE or physical layer signaling.

For example, a network side, such as the network device, configures N UL BWPs (N<=4) for the terminal, where a present active BWP of the terminal is a $k^{th}$ BWP among the configured BWPs. In this case, the terminal can initiate UL transmission on the $k^{th}$ active BWP, where the UL transmission includes transmission of an SR, a PUSCH, and/or a PRACH. In other words, the initiated UL transmission can be a UL transmission that is autonomously initiated by the terminal, rather than a UL transmission scheduled by the network.

During UL transmission, a MAC layer of the terminal can receive a UL LBT failure indication from a physical layer. The MAC layer can maintain one counter for the LBT failure indication, such as Failed_LBT_COUNTER. When the counter reaches a pre-configured threshold (such as the preset threshold described above), the terminal can determine that the LBT failure occurs, that is, a UL LBT problem exists. The $k^{th}$ BWP where the LBT failure occurs is the first UL BWP described above.

402, if the terminal detects that the LBT failure occurs in a first UL BWP, the terminal reports the indication information to the network device according to whether the first UL BWP is an initial UL BWP and/or a cell where the first UL BWP is configured.

In this implementation, a cell configured for the terminal may include a PCell and an SCell. Alternatively, a cell configured for the terminal may include an MCG and an SCG, where the MCG includes a PCell and an SCell and the SCG includes a PSCell and an SCell. In a situation where the terminal determines that the $k^{th}$ BWP has a UL LBT problem, that is, the LBT failure occurs, if the present active $k^{th}$ BWP is not the initial UL BWP and the $k^{th}$ BWP is configured for the PCell, the terminal can switch to the initial UL BWP from the present active $k^{th}$ BWP, and then the terminal can initiate a RACH procedure on the initial UL BWP and transmit the indication information to the network device through the RACH procedure. If the $k^{th}$ BWP is configured for the SCell, the terminal can switch to the initial UL BWP from a present active BWP of the PCell (on condition that the active UL BWP is not the initial UL BWP) and initiate the RACH procedure on the initial UL BWP. If the present active UL BWP is the initial UL BWP, there is no need for switching. For example, the indication information may be carried in msg3 in the RACH.

Optionally, if the terminal initiates the RACH procedure on the initial BWP and the RACH procedure is triggered due to a UL LBT problem, for example, as to the RACH procedure described above, the terminal can further notify the network device in the RACH procedure which carrier has the LBT failure. For example, a MAC CE may be carried in the msg3, and the terminal can indicate, through the MAC CE, identifier information of a cell where a BWP with a UL LBT problem (such as the $k^{th}$ BWP) of the terminal is configured, such as a serving cell index. In addition, optionally, the MAC CE may be carried in the indication information, or the MAC CE may be the indication information.

In addition, if the present active $k^{th}$ BWP is the initial UL BWP, the terminal can initiate the RLF procedure, and report the indication information to the network device through the RLF procedure. The terminal can determine which type of RLF procedure to be initiated, according to the cell (that is, serving cell) where the $k^{th}$ BWP is configured. For example, if the $k^{th}$ BWP currently having the UL LBT problem is configured for the PCell, the terminal can trigger MCG-RLF, such as an RRC reestablishment procedure. If the $k^{th}$ BWP is configured for the PScell of the SCG, the terminal can trigger SCG-RLF, such as an SCG failure information procedure. If the $k^{th}$ BWP is configured for the SCell of the MCG or the SCell of the SCG, the terminal can trigger SCell-RLF, such as a failure information procedure. Optionally, when initiating the SCG-RLF procedure, the SCell-RLF procedure, or the like, the terminal can further report identifier information of a cell where a BWP with the UL LBT problem (such as the $k^{th}$ BWP) is configured, such as a serving cell index. For example, the serving cell index may be carried in the indication information.

Optionally, if the LBT failure occurs in a non-initial UL BWP and occurs again in the initial UL BWP after the terminal switches to the initial UL BWP, the terminal can also initiate the RLF procedure, which will not be elaborated again herein.

403, the network device configures the first UL BWP according to the indication information.

Optionally, the indication information may further include a UL transmission type, an LBT category, and/or a priority of a channel accessed by the terminal corresponding to the LBT failure. As such, the network device can configure the first UL BWP (such as the $k^{th}$ BWP) according to the UL transmission type, the LBT category, and/or the channel access priority class.

For example, in NR-U, four channel access categories (that is, LBT categories) are defined, which include categories 1-4. Category 1 is immediate transmission, which means that a transmitting end can immediately transmit after a switching gap. The switching gap refers to a switching time after reception of transmission and is generally not more than 16 μs (microsecond). Category 2 is LBT without random back-off, which means that a duration of channel listening is fixed. The duration of channel listening is generally short, which may be, for example, 25 μs. Category 3 is LBT with random back-off (with a fixed contention window (CW)), which means that in an LBT procedure, the transmitting end randomly draws a random value in the CW to determine the duration of channel listening. Category 4 is LBT with random back-off (with a variable CW), which means that in an LBT procedure, the transmitting end randomly draws a random value in the CW to determine the duration of channel listening, where the CW has a variable size. In terms of category 4, the channel access priority class is shown in the following table.

| Channel access priority class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

$m_p$ is related to a duration of channel listening for channel access. The network device, such as a base station, needs to first perform channel listening for a duration Td, where Td=16 μs+$m_p$×9 μs. $CW_{min,p}$ and $CW_{max,p}$ are related to a duration of random channel listening during channel access. If a channel is idle in the listening duration Td, the base station needs to detect the channel N times again and each time lasts 9 μs, where N may be a random number that ranges from 0 to $CW_p$, and $C_{min,p} \leq CW_p \leq CW_{max,p}$. $T_{mcot,p}$ may, and be a maximum channel occupancy time (COT) after the network device preempts the channel, which is related to a channel priority class adopted by the base station. For example, if the priority class is 1, the channel is occupied for maximum 2 ms (millisecond) after channel listening succeeds. As such, the network device can configure the first UL BWP according to the LBT category and/or the channel access priority class.

In this implementation, if the LBT failure is detected by the terminal in any active UL BWP, the terminal can autonomously switch to another UL BWP such as the initial UL BWP and initiate the RACH procedure, or initiate the RLF procedure on the initial UL BWP, to report a UL LBT failure problem to the network device, rather than attempting a RACH on multiple inactive BWPs. The network side can differentiate, through the RACH procedure or the RLF procedure, whether the RACH or the RLF results from a UL LBT failure experienced by the terminal. As such, the network device can re-configure a UL BWP that has an LBT problem, which is possible to recover data transmission as soon as possible, thereby improving reliability in data transmission.

Figure 5:
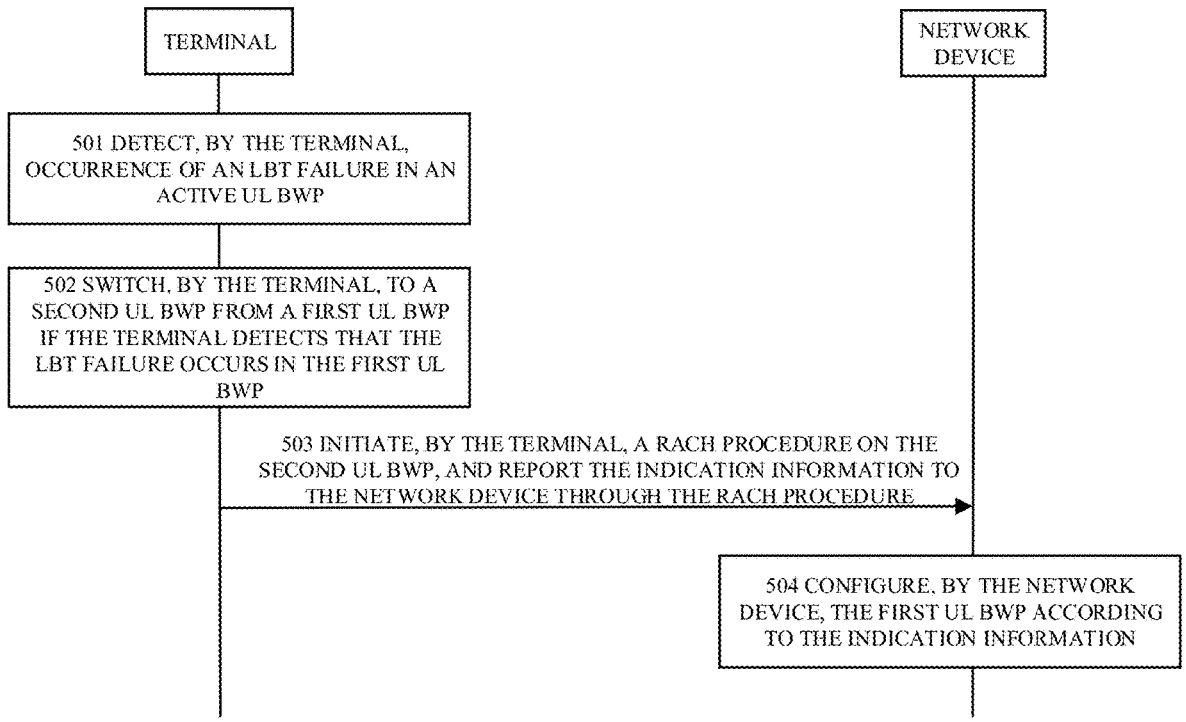
FIG. 5 is a schematic interaction diagram of a method for information reporting provided in other implementations of the disclosure.

FIG. 5 is a schematic interaction diagram of a method for information reporting provided in other implementations of the disclosure. In this implementation, a terminal may be configured with multiple UL BWPs, at least one active UL BWP exists in the multiple UL BWPs, and a cell configured for the terminal includes a PCell and an SCell. The terminal can switch from a UL BWP where an LBT failure occurs, to another UL BWP and initiate a RACH, to report the LBT failure to a network device through msg3. As illustrated in FIG. 5, the method includes the following.

501, the terminal detects occurrence of an LBT failure in the active UL BWP.

Specifically, for the manner in which the terminal detects occurrence of the LBT failure in the active UL BWP, reference can be made to related descriptions in implementations illustrated in FIG. 2, which will not be elaborated again herein.

502, if the terminal detects that the LBT failure occurs in a first UL BWP, the terminal switches to a second UL BWP from the first UL BWP, where the second UL BWP is a UL BWP configured with a PRACH resource and configured for the PCell.

The PRACH resource may include time-domain resource and/or frequency-domain resource information. For example, the PRACH resource may be used for transmitting a preamble.

If a BWP where the LBT failure occurs detected by the terminal is the first UL BWP, the terminal can switch from the first UL BWP to another BWP such as the second UL BWP, thereby reporting, on the second UL BWP, to the network device indication information used for indicating the LBT failure.

Optionally, the second UL BWP may be configured with a PUCCH resource and/or a configured grant.

503, the terminal initiates a RACH procedure on the second UL BWP, and reports the indication information to the network device through the RACH procedure.

The terminal can initiate the RACH procedure on the second UL BWP, and the indication information may be carried in the msg3, to report the LBT failure to the network device.

Optionally, the terminal can further notify the network device in the RACH procedure which carrier has the LBT failure. For example, a MAC CE may be carried in the msg3, and the terminal can indicate, through the MAC CE, information of a cell where the first UL BWP is configured, such as a serving cell index. In addition, optionally, the MAC CE may be carried in the indication information, or the MAC CE may be the indication information.

Optionally, in other implementations, the terminal can initiate an RLF procedure on the second UL BWP, to report the indication information to the network device through the RLF procedure.

504, the network device configures the first UL BWP according to the indication information.

Optionally, the indication information may further include a UL transmission type, an LBT category, and/or a priority of a channel accessed by the terminal corresponding to the LBT failure. As such, the network device can configure the first UL BWP (such as the $k^{th}$ BWP) according to the UL transmission type, the LBT category, and/or the channel access priority class, which will not be elaborated again herein.

In this implementation, the terminal can switch from a UL BWP where the LBT failure occurs, to another UL BWP and initiate a RACH, and report the LBT failure to the network device through the msg3, such that the network side can differentiate whether the RACH or the RLF is caused by a UL LBT failure experienced by the terminal. As such, the network device can re-configure a UL BWP having an LBT problem, which is possible to recover data transmission as soon as possible, thereby improving reliability in data transmission.

Figure 6:
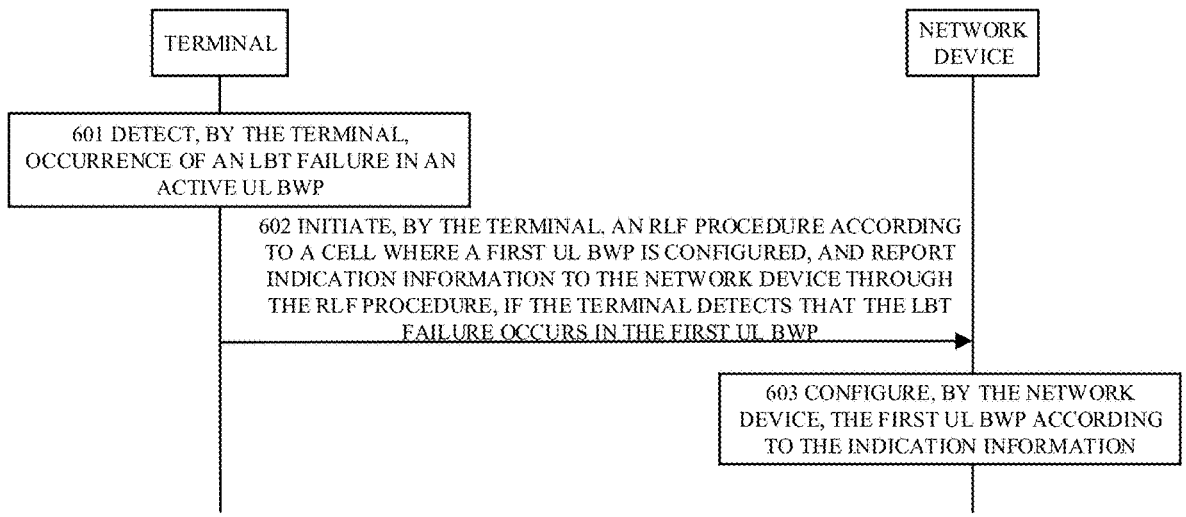
FIG. 6 is a schematic interaction diagram of a method for information reporting provided in other implementations of the disclosure.

FIG. 6 is a schematic interaction diagram of a method for information reporting provided in other implementations of the disclosure. In this implementation, a terminal may be configured with one or more UL BWPs, and at least one active UL BWP exists in the one or more UL BWPs. If an LBT failure is detected, the terminal may directly initiate an RLF procedure to report to a network side without BWP switching. As illustrated in FIG. 6, the method includes the following.

601, the terminal detects occurrence of an LBT failure in the active UL BWP.

Specifically, for the manner in which the terminal detects occurrence of the LBT failure in the active UL BWP, reference can be made to related descriptions in implementations illustrated in FIG. 2, which will not be elaborated again herein.

602, if the terminal detects that the LBT failure occurs in a first UL BWP, the terminal initiates the RLF procedure according to a cell where the first UL BWP is configured, and reports indication information to a network device through the RLF procedure.

In this implementation, a cell configured for the terminal may be an independent cell. Alternatively, the cell configured for the terminal may include a PCell and an SCell. Alternatively, the cell configured for the terminal may include an MCG and an SCG, where the MCG includes a PCell and an SCell, and the SCG includes a PSCell and an SCell.

Suppose that a BWP where the LBT failure occurs detected by the terminal is the first UL BWP, the terminal can initiate the RLF procedure, for example, trigger a failure information procedure, and report the indication information to the network device through the RLF procedure. Specifically, if the first UL BWP is configured for the PCell of the MCG, the terminal can initiate an RRC reestablishment procedure, and transmit the indication information to the network device through the RRC reestablishment procedure, that is, notify the network side in the reestablishment procedure that reestablishment of the terminal is caused by an LBT failure problem. Optionally, when initiating an RRC reestablishment request, the terminal can indicate to the network device a cause of the reestablishment in a reestablishment cause, for example, the indication information may be carried in the reestablishment cause.

If the first UL BWP is configured for the PSCell or the SCell, the terminal can initiate a failure information procedure, and transmit the indication information to the network device through the failure information procedure. Optionally, the terminal can notify the network device that a UL LBT problem exists through a failure information message, for example, the indication information may be carried in the failure information message. In addition, optionally, the terminal can further notify the network that a type of the failure is the UL LBT problem through the failure information message. Furthermore, optionally, the terminal can further notify the network device which cell has a UL LBT failure through the failure information message, for example, identifier information of a cell where a UL BWP having the LBT failure is configured (such as cell index) may be carried in the indication information. It can be understood that, if the terminal is in a connected mode, the terminal does not have to know which UL BWP has an LBT problem, because the network device knows which UL BWP is activated for the terminal when the terminal is in the connected mode and thus can determine a UL BWP where the LBT failure occurs.

With the above manner, the terminal can initiate the RLF procedure to report the indication information to the network device as long as the terminal is configured with one or more UL BWPs. For example, for a scenario in which the terminal is not configured with multiple UL BWPs, or the terminal is configured with multiple UL BWPs but no resource such as PRACH is configured for other BWPs, the manner in this implementations can still be adopted to report the indication information to the network device, such that the network side can promptly find the LBT problem.

603, the network device configures the first UL BWP according to the indication information.

Optionally, the indication information may further include a UL transmission type, an LBT category, and/or a priority of a channel accessed by the terminal corresponding to the LBT failure. As such, the network device can configure the first UL BWP (such as the $k^{th}$ BWP) according to the UL transmission type, the LBT category, and/or the channel access priority class, which will not be elaborated again herein.

In this implementation, if the UL LBT problem is detected by the terminal in any active UL BWP, the terminal does not have to initiate an autonomous BWP switching, and instead, the terminal directly triggers the RLF procedure and reports to the network device, to notify the network side that the terminal experiences a UL LBT failure problem in a certain serving cell. As such, the network device can reconfigure a UL BWP having the LBT problem, which is possible to recover data transmission as soon as possible, thereby improving reliability in data transmission.

Figure 7:
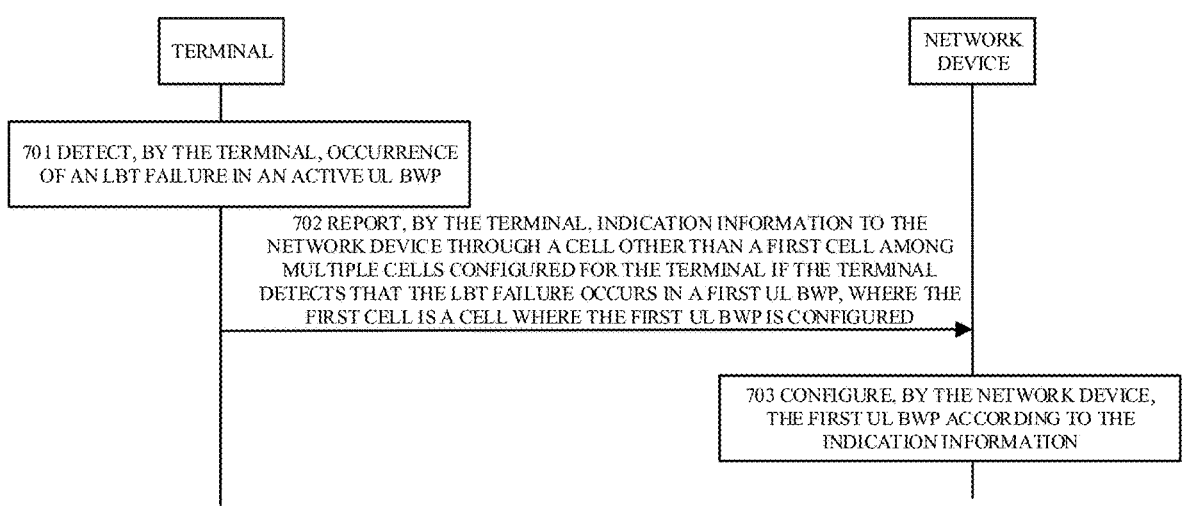
FIG. 7 is a schematic interaction diagram of a method for information reporting provided in other implementations of the disclosure.

FIG. 7 is a schematic interaction diagram of a method for information reporting provided in other implementations of the disclosure. In this implementation, a terminal may be configured with one or more UL BWPs, and at least one active UL BWP exists in the one or more UL BWPs. The terminal is configured with multiple cells, which may include a PCell and an SCell, or may include an MCG and an SCG, where the MCG includes a PCell and an SCell and the SCG includes a PSCell and an SCell. If an LBT failure is detected, the terminal can report, through other cells, to a network device indication information used for indicating the LBT failure. As illustrated in FIG. 7, the method includes the following.

701, the terminal detects occurrence of an LBT failure in the active UL BWP.

Specifically, for the manner in which the terminal detects occurrence of the LBT failure in the active UL BWP, reference can be made to related descriptions in implementations illustrated in FIG. 2, which will not be elaborated again herein.

702, if the terminal detects that the LBT failure occurs in a first UL BWP, the terminal reports the indication information to the network device through a cell other than a first cell among multiple cells configured for the terminal, where the first cell is a cell where the first UL BWP is configured.

Suppose that a BWP where the LBT failure occurs detected by the terminal is the first UL BWP, the first cell may refer to a cell where a UL BWP in which the LBT failure occurs (that is, the first UL BWP) is configured.

Specifically, in a CA scenario, if the terminal detects that LBT failure occurs in any active UL BWP, the terminal may report to the network device the indication information used for indicating the LBT failure through a second cell, where the second cell may refer to any cell configured for the terminal other than the first cell.

Optionally, the indication information may be used for indicating which carrier has a UL LBT failure, for example, identifier information of the first cell may be carried in the indication information. As such, the network device can reconfigure a UL BWP having an LBT problem, thereby solving the LBT problem. In addition, optionally, the indication information may be carried in a MAC CE or physical layer signaling.

For example, the network device configures a CA for the terminal, and each carrier is configured with N UL BWPs (suppose that N<=4). A present active BWP of the terminal is a $k^{th}$ BWP among the configured BWPs. Suppose that the terminal initiates UL transmission on a $k^{th}$ active BWP of SCell 1, where the UL transmission may include transmission of an SR, a PUSCH, and/or a PRACH. If the terminal determines that the LBT failure occurs in the $k^{th}$ BWP and a cell where the $k^{th}$ BWP is configured is SCell 1, the terminal can report a UL LBT problem of SCell 1 to the network device through other serving cells, such as the PCell or SCell 2. For example, the terminal can report through a MAC CE or physical layer signaling, to indicate that the LBT failure occurs in SCell 1. Optionally, identifier information of SCell 1 may be further carried in the MAC CE or the physical layer signaling. In other words, if the SCell has an LBT problem, the terminal can directly report the LBT problem through other cells without initiating a RACH procedure or an RLF procedure.

703, the network device configures the first UL BWP according to the indication information.

Optionally, the indication information may further include a UL transmission type, an LBT category, and/or a priority of a channel accessed by the terminal corresponding to the LBT failure. As such, the network device can configure the first UL BWP (such as the $k^{th}$ BWP) according to the UL transmission type, the LBT category, and/or the channel access priority class, which will not be elaborated again herein.

In this implementation, if the UL LBT problem is detected by the terminal in any active UL BWP, the terminal does not have to initiate the RACH procedure or the RLF procedure and instead, directly reports the indication information to the network device through other cells to indicate the LBT problem. As such, the network device can reconfigure a UL BWP that has the LBT problem, which can recover data transmission as soon as possible and thus can improve reliability in data transmission.

It can be understood that, the foregoing method implementations are examples of the method for information reporting in the disclosure. The description of each implementation has its own emphasis. For the parts not described in detail in one implementation, reference may be made to related descriptions in other implementations.

Figure 8:
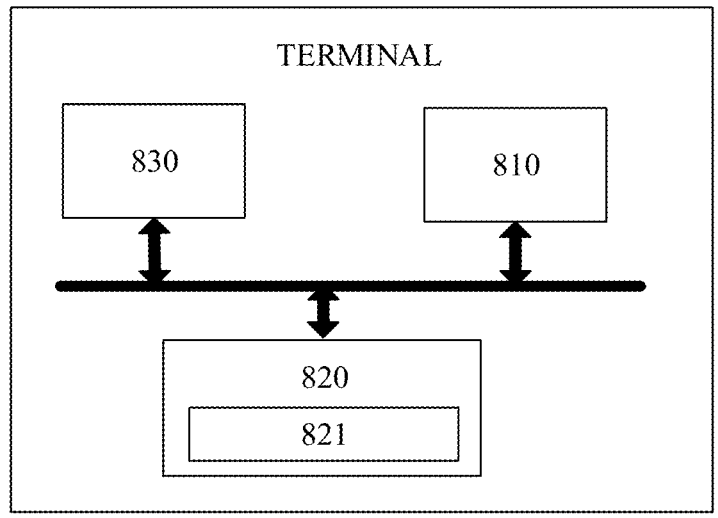
FIG. 8 is a schematic structural diagram of a terminal provided in implementations of the disclosure.

FIG. 8 is a schematic structural diagram of a terminal provided in implementations of the disclosure. As illustrated in FIG. 8, the terminal 800 includes a processor 810, a memory 820, a communication interface 830, and one or more programs 821. The one or more programs 821 are stored in the memory 820 and configured to be executed by the processor 810. The programs include instructions configured to perform the following operations.

Occurrence of an LBT failure in an active UL BWP is detected. If the LBT failure is detected to occur in any active UL BWP, indication information is reported to a network device, where the indication information is used for indicating the LBT failure.

Optionally, in terms of detecting occurrence of the LBT failure in the active UL BWP, the instructions in the programs are configured to perform the following operations. The number of LBT failure indications obtained during UL transmission on the active UL BWP is counted. When the number of LBT failure indications corresponding to any active UL BWP is greater than a preset threshold, determine that the LBT failure occurs in the active UL BWP.

Optionally, in terms of counting the number of LBT failure indications obtained during UL transmission on the active UL BWP, the instructions in the programs are configured to perform the following operations. When the terminal receives an LBT failure indication during UL transmission on the active UL BWP, the terminal increments a counter by one and starts or restarts a first timer. When the first timer expires, the terminal clears the counter.

Optionally, in terms of reporting the indication information to the network device when the terminal detects that the LBT failure occurs in any active UL BWP, the instructions in the programs are configured to perform the following operations. If the LBT failure is detected to occur in any active UL BWP, a second timer is started. The indication information is reported to the network device if no channel available indication is received in a first UL BWP within a duration of the second timer, where the LBT failure occurs in the first UL BWP.

Optionally, a cell configured for the terminal includes a PCell and an SCell. In terms of reporting the indication information to the network device, the instructions in the programs are configured to perform the following operations. Switch to an initial UL BWP from the first UL BWP if the first UL BWP is not the initial UL BWP, where the LBT failure occurs in the first UL BWP and the first UL BWP is a UL BWP configured for the PCell. A RACH procedure is initiated on the initial UL BWP, and the indication information is transmitted to the network device through the RACH procedure.

Optionally, a cell configured for the terminal includes a PCell and an SCell, and each cell has one active UL BWP. In terms of reporting the indication information to the network device, the instructions in the programs are configured to perform the following operations. Switch to the initial UL BWP from an active UL BWP of the PCell, if the first UL BWP where the LBT failure occurs is a UL BWP configured for the SCell and the active UL BWP of the PCell is not the initial UL BWP. The RACH procedure is initiated on the initial UL BWP, and the indication information is transmitted to the network device through the RACH procedure.

Optionally, in terms of reporting the indication information to the network device, the instructions in the programs are configured to perform the following operations. If the first UL BWP where the LBT failure occurs is the initial UL BWP, an RLF procedure is initiated and the indication information is transmitted to the network device through the RLF procedure.

Optionally, a cell configured for the terminal includes an MCG and an SCG, the MCG includes a PCell and an SCell, the SCG includes a PScell and an SCell, and each cell has one active UL BWP. In terms of initiating the RLF procedure, the instructions in the programs are configured to perform the following operations. If the first UL BWP is a UL BWP configured for the PCell of the MCG, an RRC reestablishment procedure is initiated. If the first UL BWP is a UL BWP configured for the PScell of the SCG, an SCG failure information procedure is initiated. If the first UL BWP is a UL BWP configured for the SCell of the MCG or the SCell of the SCG, a failure information procedure is initiated.

Optionally, a cell configured for the terminal includes a PCell and an SCell. In terms of reporting the indication information to the network device, the instructions in the programs are configured to perform the following operations. Switch to a second UL BWP from the first UL BWP where the LBT failure occurs, where the second UL BWP is a UL BWP configured with a PRACH resource and configured for the PCell. The RACH procedure is initiated on the second UL BWP, and the indication information is transmitted to the network device through the RACH procedure.

Optionally, the second UL BWP is a UL BWP configured with a PUCCH resource and/or a semi-static resource.

Optionally, a cell configured for the terminal includes an MCG and an SCG, where the MCG includes a PCell and an SCell and the SCG includes a PScell and an SCell. In terms of reporting the indication information to the network device, the instructions in the programs are configured to perform the following operations. If the first UL BWP where the LBT failure occurs is a UL BWP configured for the PCell of the MCG, an RRC reestablishment procedure is initiated and the indication information is transmitted to the network device through the RRC reestablishment procedure. If the first UL BWP where the LBT failure occurs is a UL BWP configured for the PScell or the SCell, a failure information procedure is initiated and the indication information is transmitted to the network device through the failure information procedure.

Optionally, in terms of reporting the indication information to the network device, the instructions in the programs are configured to perform the following operations. The indication information is reported to the network device through a cell other than a first cell among multiple cells configured for the terminal, where the first cell is a cell where the first UL BWP is configured and the LBT failure occurs in the first UL BWP.

Optionally, the RACH procedure includes transmission of msg3 to the network device, where the msg3 contains the indication information.

Optionally, the indication information further includes identifier information of the cell where the first UL BWP is configured, where the LBT failure occurs in the first UL BWP.

Optionally, the indication information is a MAC CE or physical layer signaling.

Optionally, the indication information further includes a UL transmission type, an LBT category, and/or a priority of a channel accessed by the terminal corresponding to the LBT failure.

Figure 9:
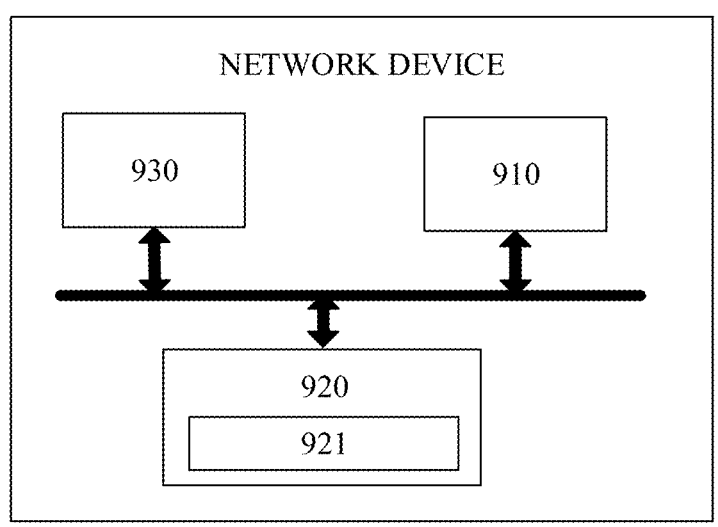
FIG. 9 is a schematic structural diagram of a network device provided in implementations of the disclosure.

FIG. 9 is a schematic structural diagram of a network device provided in implementations of the disclosure. As illustrated in FIG. 9, the network device 900 includes a processor 910, a memory 920, a communication interface 930, and one or more programs 921. The one or more programs 921 are stored in the memory 920 and configured to be executed by the processor 910. The programs include instructions configured to perform the following operations.

Indication information reported by a terminal is received, where the indication information is used for indicating an LBT failure. A UL BWP corresponding to the LBT failure is configured according to the indication information.

Optionally, in terms of receiving the indication information reported by the terminal, the instructions in the programs are configured to perform the following operations. The indication information reported by the terminal is received through a RACH procedure or an RLF procedure initiated by the terminal.

Optionally, the RACH procedure includes reception of msg3 transmitted by the terminal by the network device, where the msg3 contains the indication information.

Optionally, the indication information further includes identifier information of a cell where a first UL BWP is configured and the LBT failure occurs in the first UL BWP. In terms of configuring the UL BWP corresponding to the LBT failure according to the indication information, the instructions in the programs are configured to perform the following operations. The first UL BWP where the LBT failure occurs is determined according to the identifier information. The first UL BWP is configured.

Optionally, the indication information is a MAC CE or physical layer signaling.

Optionally, the indication information further includes a UL transmission type, an LBT category, and/or a priority of a channel accessed by the terminal corresponding to the LBT failure.

Technical solutions of implementations of the disclosure have been elaborated above from the perspective of interaction between various network elements. It can be understood that, in order to implement the above functions, the terminal includes hardware structures and/or software modules for performing respective functions. Those of ordinary skill in the art will appreciate that units and algorithmic operations of various examples described in connection with implementations disclosed herein can be implemented by hardware or by a combination of hardware and computer software. Whether these functions are performed by means of hardware or hardware driven by computer software depends on the application and the design constraints of the associated technical solution. Those skilled in the art may use different methods with regard to each particular application to implement the described functionality, but such methods should not be regarded as lying beyond the scope of the disclosure.

Division of functional units of the terminal and the network device may be implemented according to the above method implementations. For example, various functional units may be in one-to-one correspondence with each function, or two or more functions may be integrated into one processing unit. The integrated unit may be implemented in the form of hardware, or may be implemented in the form of software program module. It is to be noted that, division of units in implementations of the disclosure is illustrative and is only a division of logical functions, and other manners of division may be available in practice.

Figure 10:
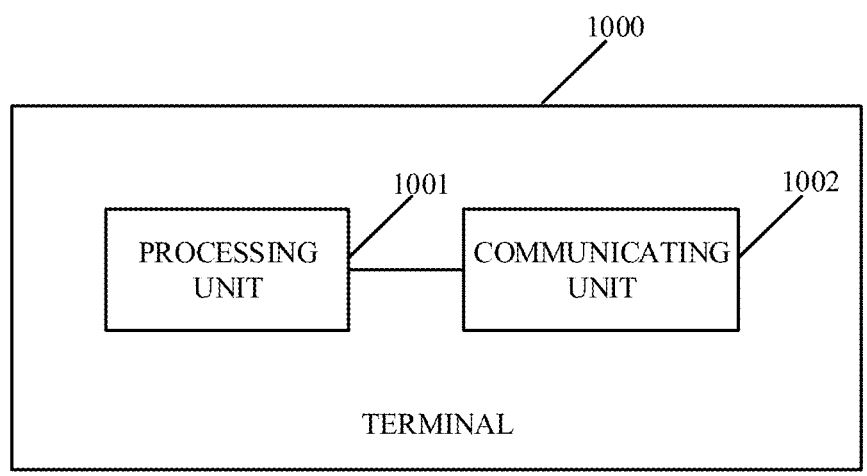
FIG. 10 is a schematic structural diagram of a terminal provided in other implementations of the disclosure.

FIG. 10 is a schematic structural diagram of a terminal provided in other implementations of the disclosure. As illustrated in FIG. 10, the terminal 1000 includes a processing unit 1001 and a communicating unit 1002. These units can perform functions of the terminal described in the foregoing method implementations. The processing unit 1001 is configured to control and manage operations of the terminal. For example, the processing unit 1001 is configured for the terminal to perform operations at step 201 and step 202 illustrated in FIG. 2, operations at step 401 and step 402 illustrated in FIG. 4, operations at step 501 to step 503 illustrated in FIG. 5, operations at step 601 and step 602 illustrated in FIG. 6, operations at step 701 and step 702 illustrated in FIG. 7, and/or other processes described in the technical solutions of implementations of the disclosure. The communicating unit 1002 is configured for the terminal to communicate with other devices, for example, to communicate with a network device. The terminal may further include a storage unit 1003. The storage unit 1003 is configured to store program codes and data of the terminal.

The processing unit 1001 may be a processor or a controller and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits disclosed in the disclosure can be implemented or executed. The processor may also be a combination for implementing computing functions, for example, one or more microprocessors, a combination of DSP and microprocessor, or the like. The communicating unit 1002 may be a transceiver, a transceiver circuit, a radio frequency (RF) chip, etc. The storage unit 1003 may be a memory.

For example, the processing unit 1001 is configured to detect occurrence of an LBT failure in an active UL BWP. The communicating unit 1002 is configured to report indication information to a network device if the processing unit detects that the LBT failure occurs in any active UL BWP, where the indication information is used for indicating the LBT failure.

Optionally, the processing unit 1001 is configured to operate as follows. The processing unit 1001 is configured to count the number of LBT failure indications obtained during UL transmission on the active UL BWP. The processing unit 1001 is configured to determine that the LBT failure occurs in the active UL BWP, when the number of LBT failure indications corresponding to any active UL BWP is greater than a preset threshold.

Optionally, the processing unit 1001 is configured to operate as follows. The processing unit 1001 is configured to increment a counter by one and start or restart a first timer, when an LBT failure indication is received during UL transmission on the active UL BWP. The processing unit 1001 is configured to clear the counter when the first timer expires.

Optionally, the number of LBT failure indications is the number of LBT failure indications that are consecutively obtained.

Optionally, the processing unit 1001 is configured to start a second timer when the processing unit detects that the LBT failure occurs in any active UL BWP. The communicating unit 1002 is configured to report the indication information to the network device when no channel available indication is received in a first UL BWP within a duration of the second timer, where the LBT failure occurs in the first UL BWP.

Optionally, a cell configured for the terminal includes a PCell and an SCell. The processing unit 1001 is configured to switch to an initial UL BWP from the first UL BWP when the first UL BWP is not the initial UL BWP, where the LBT failure occurs in the first UL BWP and the first UL BWP is a UL BWP configured for the PCell. The communicating unit 1002 is configured to initiate a RACH procedure on the initial UL BWP, and transmit the indication information to the network device through the RACH procedure.

Optionally, a cell configured for the terminal includes a PCell and an SCell, and each cell has one active UL BWP. The processing unit 1001 is configured to switch to the initial UL BWP from an active UL BWP of the PCell, when the first UL BWP where the LBT failure occurs is a UL BWP configured for the SCell and the active UL BWP of the PCell is not the initial UL BWP. The communicating unit 1002 is configured to initiate the RACH procedure on the initial UL BWP, and transmit the indication information to the network device through the RACH procedure.

Optionally, the communicating unit 1002 is configured to initiate an RLF procedure and transmit the indication information to the network device through the RLF procedure, when the first UL BWP where the LBT failure occurs is the initial UL BWP.

Optionally, a cell configured for the terminal includes an MCG and an SCG, the MCG includes a PCell and an SCell, the SCG includes a PScell and an SCell, and each cell has one active UL BWP. The communicating unit 1002 is configured to operate as follows. The communicating unit

1002 is configured to initiate an RRC reestablishment procedure, when the first UL BWP is a UL BWP configured for the PCell of the MCG. The communicating unit 1002 is configured to initiate an SCG failure information procedure, when the first UL BWP is a UL BWP configured for the PScell of the SCG. The communicating unit 1002 is configured to initiate a failure information procedure, when the first UL BWP is a UL BWP configured for the SCell of the MCG or the SCell of the SCG.

Optionally, a cell configured for the terminal includes a PCell and an SCell. The processing unit 1001 is configured to switch to a second UL BWP from the first UL BWP where the LBT failure occurs, where the second UL BWP is a UL BWP configured with a PRACH resource and configured for the PCell. The communicating unit 1002 is configured to initiate the RACH procedure on the second UL BWP, and transmit the indication information to the network device through the RACH procedure.

Optionally, the second UL BWP is a UL BWP configured with a PUCCH resource and/or a semi-static resource.

Optionally, a cell configured for the terminal includes an MCG and an SCG, where the MCG includes a PCell and an SCell and the SCG includes a PScell and an SCell. The communicating unit 1002 is configured to operate as follows. The communicating unit 1002 is configured to initiate the RRC reestablishment procedure and transmit the indication information to the network device through the RRC reestablishment procedure, when the first UL BWP where the LBT failure occurs is a UL BWP configured for the PCell of the MCG. The communicating unit 1002 is configured to initiate the failure information procedure and transmit the indication information to the network device through the failure information procedure, when the first UL BWP where the LBT failure occurs is a UL BWP configured for the PScell or the SCell.

Optionally, the communicating unit 1002 is configured to report the indication information to the network device through a cell other than a first cell among multiple cells configured for the terminal, where the first cell is a cell where the first UL BWP is configured and the LBT failure occurs in the first UL BWP.

Optionally, the RACH procedure includes transmission of msg3 to the network device, where the msg3 contains the indication information.

Optionally, the indication information further includes identifier information of the cell where the first UL BWP is configured, where the LBT failure occurs in the first UL BWP.

Optionally, the indication information is a MAC CE or physical layer signaling.

Optionally, the indication information further includes a UL transmission type, an LBT category, and/or a priority of a channel accessed by the terminal corresponding to the LBT failure.

When the processing unit 1001 is a processor, the communicating unit 1002 is a communication interface, and the storage unit 1003 is a memory, the terminal in the implementation of the disclosure may be the terminal illustrated in FIG. 8.

Optionally, with aid of the units described above, the terminal can implement some or all operations performed by the terminal in the foregoing method implementations illustrated in FIG. 2 to FIG. 7. It should be understood that, the implementations of the disclosure are apparatus implementations corresponding to the method implementations. Descriptions of the method implementations can also be applied to the implementations of the disclosure, which will not be repeated herein.

Figure 11:
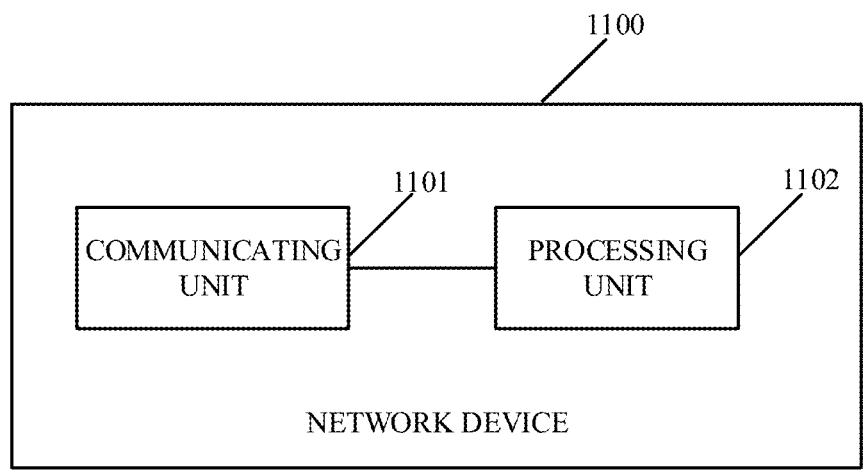
FIG. 11 is a schematic structural diagram of a network device provided in other implementations of the disclosure.

FIG. 11 is a schematic structural diagram of a network device provided in other implementations of the disclosure. As illustrated in FIG. 11, the network device 1100 includes a communicating unit 1101 and a processing unit 1102. These units can perform functions of the network device described in the foregoing method implementations. The processing unit 1102 is configured to control and manage operations of the network device. For example, the processing unit 1102 is configured for the network device to perform operations at step 301 and step 302 illustrated in FIG. 3, operations at step 403 illustrated in FIG. 4, operations at step 504 illustrated in FIG. 5, operations at step 603 illustrated in FIG. 6, operations at step 703 illustrated in FIG. 7, and/or other processes described in the technical solutions of implementations of the disclosure. The communicating unit 1101 is configured for the network device to communicate with other devices, for example, to communicate with a terminal. The network device may further include a storage unit 1103. The storage unit 1103 is configured to store program codes and data of the network device.

The processing unit 1102 may be a processor or a controller. The communicating unit 1101 may be a transceiver, a transceiver circuit, an RF chip, etc. The storage unit 1103 may be a memory.

For example, the communicating unit 1101 is configured to receive indication information reported by a terminal, where the indication information is used for indicating an LBT failure. The processing unit 1102 is configured to configure a UL BWP corresponding to the LBT failure according to the indication information.

Optionally, the communicating unit 1101 is configured to receive the indication information reported by the terminal, through a RACH procedure or an RLF procedure initiated by the terminal.

Optionally, the RACH procedure includes reception of msg3 transmitted by the terminal by the network device, where the msg3 contains the indication information.

Optionally, the indication information further includes identifier information of a cell where a first UL BWP is configured and the LBT failure occurs in the first UL BWP. The processing unit 1102 is configured to operate as follows. The processing unit 1102 is configured to determine the first UL BWP where the LBT failure occurs, according to the identifier information. The processing unit 1102 is configured to configure the first UL BWP.

Optionally, the indication information is a MAC CE or physical layer signaling.

Optionally, the indication information further includes a UL transmission type, an LBT category, and/or a priority of a channel accessed by the terminal corresponding to the LBT failure.

When the processing unit 1102 is a processor, the communicating unit 1101 is a communication interface, and the storage unit 1103 is a memory, the network device in the implementations of the disclosure may be the network device illustrated in FIG. 9.

Optionally, with aid of the units described above, the network device can implement some or all operations performed by the network device in the foregoing method implementations illustrated in FIG. 2 to FIG. 7. It should be understood that, the implementations of the disclosure are apparatus implementations corresponding to the method implementations. Descriptions of the method implementations can also be applied to the implementations of the disclosure, which will not be repeated herein.

It can be understood that, the division of units in implementations of the disclosure is illustrative and is only a division of logical functions, and other manners of division may also available in practice. Various functional units described in implementations of the disclosure may be integrated into one processing unit or may be present as a number of physically separated units, and two or more units may be integrated into one. The integrated unit may take the form of hardware or a software functional unit.

The disclosure further provides a communication system. The communication system includes the terminal and/or the network device described above. Optionally, the communication system may further include other devices that interact with the network elements described above in the technical solutions provided in implementations of the disclosure. The network device and/or the terminal can perform some or all operations of the methods illustrated in FIG. 2 to FIG. 7. For details thereof, reference can be made to related descriptions in the foregoing implementations, which will not be repeated herein.

Implementations of the disclosure further provide a computer readable storage medium. The computer readable storage medium is configured to store computer programs for electronic data interchange (EDI). The computer programs, when executed, are operable with a computer to perform some or all operations performed by the terminal or the network device in the foregoing method implementations.

Implementations of the disclosure further provide a computer program product. The computer program product includes a non-transitory computer readable storage medium storing computer programs. The computer programs are operable with a computer to perform some or all operations performed by the terminal or the network device in the foregoing method implementations. The computer program product may be a software installation package.

Methods or algorithmic operations described in connection with the implementations of the disclosure may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in a communication device such as the terminal and the network device. The processor and the storage medium may also be present as discrete components in the communication device.

It can be understood that, the "first", "second", "third", and various numerical numbers used herein are merely intended for distinction for the convenience of description, rather than limiting the scope of implementations of the disclosure. The term "and/or" herein only describes an association relationship between associated objects, which means that there can be three relationships. For example, A and/or B can mean A alone, both A and B exist, and B alone.

In addition, the character "/" herein, unless otherwise specified, generally indicates that the associated objects are in an "or" relationship.

Those skilled in the art will appreciate that, all or part of functions described in one or more of the foregoing implementations can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

What is claimed is:

1. A method for information reporting, being applicable to a terminal, the terminal being configured with one or more uplink (UL) bandwidth parts (BWP), at least one active UL BWP existing in the one or more UL BWPs, and the method comprising:

detecting, by the terminal, occurrence of a listen before talk (LBT) failure in the active UL BWP; and reporting, by the terminal, indication information to a network device when the terminal detects that the LBT failure occurs in any active UL BWP, the indication information being used for indicating the LBT failure, wherein a cell configured for the terminal comprises a master cell group (MCG) and a secondary cell group (SCG), the MCG comprises a PCell and an SCell, the SCG comprises a primary secondary cell (PScell) and a secondary cell (SCell), and reporting, by the terminal, the indication information to the network device comprises:

initiating, by the terminal, an RRC reestablishment procedure and transmitting the indication information to the network device through the RRC reestablishment procedure, when a first UL BWP where the LBT failure occurs is a UL BWP configured for the PCell of the MCG; or initiating, by the terminal, a failure information procedure and transmitting the indication information to the network device through the failure information procedure, when the first UL BWP where the LBT failure occurs is a UL BWP configured for the PScell or the SCell, and wherein the indication information further comprises:

identifier information of the cell where the first UL BWP is configured, wherein the LBT failure occurs in the first UL BWP; and
a UL transmission type, an LBT category, and/or a priority of a channel accessed by the terminal corresponding to the LBT failure.

2. The method of claim 1, wherein detecting, by the terminal, occurrence of the LBT failure in the active UL BWP comprises:
counting, by the terminal, a number of LBT failure indications obtained during UL transmission on the active UL BWP; and
determining, by the terminal, that the LBT failure occurs in the active UL BWP, when the number of LBT failure indications corresponding to any active UL BWP is greater than a preset threshold.

3. The method of claim 2, wherein counting, by the terminal, the number of LBT failure indications obtained during UL transmission on the active UL BWP comprises:
incrementing, by the terminal, a counter by one and starting or restarting a first timer, when the terminal receives an LBT failure indication during UL transmission on the active UL BWP; and
clearing, by the terminal, the counter when the first timer expires.

4. The method of claim 2, wherein reporting, by the terminal, the indication information to the network device when the terminal detects that the LBT failure occurs in any active UL BWP comprises:
starting, by the terminal, a second timer when the terminal detects that the LBT failure occurs in any active UL BWP; and
reporting, by the terminal, the indication information to the network device when no channel available indication is received in a first UL BWP by the terminal within a duration of the second timer, wherein the LBT failure occurs in the first UL BWP.

5. The method of claim 1, wherein a cell configured for the terminal comprises a primary cell (PCell) and a secondary cell (SCell), and reporting, by the terminal, the indication information to the network device comprises:
switching, by the terminal, to an initial UL BWP from a first UL BWP when the first UL BWP is not the initial UL BWP, wherein the LBT failure occurs in the first UL BWP and the first UL BWP is a UL BWP configured for the PCell; and
initiating, by the terminal, a random access channel (RACH) procedure on the initial UL BWP, and transmitting the indication information to the network device through the RACH procedure.

6. The method of claim 5, wherein the RACH procedure comprises transmission of msg3 to the network device, and the msg3 contains the indication information.

7. The method of claim 1, wherein a cell configured for the terminal comprises a PCell and an SCell, each cell has one active UL BWP, and reporting, by the terminal, the indication information to the network device comprises:
switching, by the terminal, to an initial UL BWP from an active UL BWP of the PCell, when a first UL BWP where the LBT failure occurs is a UL BWP configured for the SCell and the active UL BWP of the PCell is not the initial UL BWP; and
initiating, by the terminal, a RACH procedure on the initial UL BWP, and transmitting the indication information to the network device through the RACH procedure.

8. The method of claim 1, wherein reporting, by the terminal, the indication information to the network device comprises:
initiating, by the terminal, a radio link failure (RLF) procedure and transmitting the indication information to the network device through the RLF procedure, when a first UL BWP where the LBT failure occurs is an initial UL BWP.

9. The method of claim 8, wherein a cell configured for the terminal comprises a master cell group (MCG) and a secondary cell group (SCG), the MCG comprises a PCell and an SCell, the SCG comprises a primary secondary cell (PScell) and an SCell, each cell has one active UL BWP, and initiating, by the terminal, the RLF procedure comprises:
initiating, by the terminal, a radio resource control (RRC) reestablishment procedure, when the first UL BWP is a UL BWP configured for the PCell of the MCG;
initiating, by the terminal, an SCG failure information procedure, when the first UL BWP is a UL BWP configured for the PScell of the SCG;
initiating, by the terminal, a failure information procedure, when the first UL BWP is a UL BWP configured for the SCell of the MCG or the SCell of the SCG.

10. The method of claim 1, wherein a cell configured for the terminal comprises a PCell and an SCell, and reporting, by the terminal, the indication information to the network device comprises:
switching, by the terminal, to a second UL BWP from a first UL BWP where the LBT failure occurs, wherein the second UL BWP is a UL BWP configured with a physical random access channel (PRACH) resource and configured for the PCell; and
initiating, by the terminal, a RACH procedure on the second UL BWP, and transmitting the indication information to the network device through the RACH procedure.

11. The method of claim 10, wherein the second UL BWP is a UL BWP configured with a physical uplink control channel (PUCCH) resource and/or a semi-static resource.

12. The method of claim 1, wherein reporting, by the terminal, the indication information to the network device comprises:
reporting, by the terminal, the indication information to the network device through a cell other than a first cell among a plurality of cells configured for the terminal, wherein the first cell is a cell where a first UL BWP is configured and the LBT failure occurs in the first UL BWP.

13. The method of claim 1, wherein the indication information is a media access control (MAC) control element (CE) or physical layer signaling.

14. A method for information indication, comprising:
receiving, by a network device, indication information reported by a terminal, the indication information being used for indicating a listen before talk (LBT) failure; and
configuring, by the network device, an uplink (UL) bandwidth part (BWP) corresponding to the LBT failure according to the indication information, wherein
the indication information is received in an RRC reestablishment procedure when a first UL BWP where the LBT failure occurs is a UL BWP configured for a PCell of a master cell group (MCG) configured for the terminal, or
the indication information is received in a failure information procedure when the first UL BWP where the LBT failure occurs is a UL BWP configured for a primary secondary cell (PScell) or a secondary cell (SCell) configured for the terminal;
wherein the indication information comprises:
a UL transmission type, an LBT category, and/or a priority of a channel accessed by the terminal corresponding to the LBT failure.

15. The method of claim 14, wherein receiving, by the network device, the indication information reported by the terminal comprises:
receiving, by the network device, the indication information reported by the terminal, through a random access channel (RACH) procedure or a radio link failure (RLF) procedure initiated by the terminal.

16. The method of claim 15, wherein the RACH procedure comprises reception of msg3 transmitted by the terminal by the network device, and the msg3 contains the indication information.

17. The method of any of claim 14, wherein the indication information further comprises identifier information of a cell where a first UL BWP is configured and the LBT failure occurs in the first UL BWP, and configuring, by the network device, the UL BWP corresponding to the LBT failure according to the indication information comprises:
determining, by the network device, the first UL BWP where the LBT failure occurs, according to the identifier information; and
configuring, by the network device, the first UL BWP.

18. A terminal, comprising:
a processor, a transceiver; and
a memory storing one or more programs which, when executed by the processor, are operable with the processor to:
detect occurrence of a listen before talk (LBT) failure in the active UL BWP; and
report, through the transceiver, indication information to a network device when the processor detects that the LBT failure occurs in an active UL BWP, the indication information being used for indicating the LBT failure, wherein
a cell configured for the terminal comprises a master cell group (MCG) and a secondary cell group (SCG), the MCG comprises a primary secondary cell (PCell) and a second cell (SCell), the SCG comprises a PScell and a SCell, and reporting, by the terminal, the indication information to the network device, and the processor configured to report, through the transceiver, the indication information to the network device is configured to:
initiate an RRC reestablishment procedure and cause the transceiver to transmit the indication information to the network device through the RRC reestablishment procedure, when a first UL BWP where the LBT failure occurs is a UL BWP configured for the PCell of the MCG; or
initiate a failure information procedure and cause the transceiver to transmit the indication information to the network device through the failure information procedure, when the first UL BWP where the LBT failure occurs is a UL BWP configured for the PScell or the SCell, and
wherein the indication information further comprises:
identifier information of the cell where the first UL BWP is configured, wherein the LBT failure occurs in the first UL BWP; and
a UL transmission type, an LBT category, and/or a priority of a channel accessed by the terminal corresponding to the LBT failure.

19. The terminal of claim 18, wherein the processor configured to detect occurrence of the LBT failure in the active UL BWP is configured to:
count a number of LBT failure indications obtained during UL transmission on the active UL BWP; and
determine that the LBT failure occurs in the active UL BWP, when the number of LBT failure indications corresponding to any active UL BWP is greater than a preset threshold.

20. The terminal of claim 19, wherein the processor configured to report, through the transceiver, the indication information to the network device when the terminal detects that the LBT failure occurs in an active UL BWP is configured to:
start a second timer when the terminal detects that the LBT failure occurs in any active UL BWP; and
report, through the transceiver, the indication information to the network device when no channel available indication is received in a first UL BWP by the terminal within a duration of the second timer, wherein the LBT failure occurs in the first UL BWP.

* * * * *